United States Patent [19]

Sudo et al.

[11] Patent Number: 4,468,801
[45] Date of Patent: Aug. 28, 1984

[54] ROTARY ANODE X-RAY TUBE

[75] Inventors: Hajime Sudo; Atsushi Takahashi, both of Yokohama, Japan

[73] Assignee: Tokyo Shibaura Denki Kabushiki Kaisha, Kawasaki, Japan

[21] Appl. No.: 401,814

[22] Filed: Jul. 26, 1982

[30] Foreign Application Priority Data

Jul. 30, 1981 [JP] Japan ................................ 56-118428

[51] Int. Cl.³ .............................................. H01J 35/04
[52] U.S. Cl. ..................................... 378/132; 378/130
[58] Field of Search ........................................ 378/132

[56] References Cited

U.S. PATENT DOCUMENTS 3,878,395  4/1975  Seifert et al. ......................... 250/402
4,040,681  8/1977  van der Heide ....................... 308/10
4,081,707  3/1978  Hartl et al. ............................ 313/60
4,167,671  9/1979  Boden et al. ......................... 250/406

Primary Examiner—Craig E. Church
Attorney, Agent, or Firm—Oblon, Fisher, Spivak, McClelland & Maier

[57] ABSTRACT

An evacuated casing has outer and inner tubes respectively covering the outer and inner peripheries of a hollow cylindrical rotor. Ring members of a ferromagnetic material are provided in the inner wall of the rotor and face permanent magnets, which are provided on the inner periphery of the inner tube and are magnetized in the radial directions of the rotor. The permanent magnets are fitted on a cylindrical yoke between first and second poles formed thereon, the fluxes being inserted in the rotor via the inner tube. The first poles are disposed to face the respective ring members, while the second pole is disposed to face the opposed end faces of the ring members. With this arrangement, contactless magnetic bearings are formed to support the rotor stably.

21 Claims, 15 Drawing Figures

ROTARY ANODE X-RAY TUBE

BACKGROUND OF THE INVENTION

This invention relates to rotary anode X-ray tubes in which a rotary anode is supported on a rotor which is supported by contactless magnetic bearings.

In the X-ray tubes, an anode emits X-rays as it is bombarded by high speed electrons from a cathode. The energy with which electrons bombard the anode is mostly converted to heat elevating the anode to a high temperature as high as more than 1,000 degrees centigrade. To avoid partial overheating and melting of a particular portion of the anode, the anode is rotated while the tube is in operation. The rotational frequency of such a rotary anode is as high as 18,000 to 20,000 r.p.m. For supporting the drive shaft of the rotary anode in such a high speed condition magnetic bearings are used. Various rotary anode X-ray tubes, which use contactless magnetic bearings for supporting a drive shaft of a rotary anode, are well known in the art and include the one disclosed in U.S. Pat. No. 4,167,671. In this disclosed X-ray tube, magnetic bearings are formed by permanent magnets which are magnetized in a direction parallel to the drive shaft of the rotary anode. The magnetic fluxes produced from these permanent magnets mostly proceed through a rotor along the drive shaft. The drive shaft is stably held in position in its axial direction by adjusting the magnetic fluxes generated therefrom. The drive shaft must also be stably held in position in directions at right angles to its axial direction. To stably hold the drive shaft in a direction normal to its axial direction by using a magnetic bearings, electromagnets are used independently of the permanent magnets. When external forces are applied to the rotor in radial directions at right angles to the axial direction, therefore, large currents have to be supplied to the electromagnets to stably hold the rotor in a balancing position. At any rate, with the prior art rotary anode X-ray tube the rotor can not be stably held in position, both in its axial direction and in a direction normal thereto, with the sole magnetic forces of permanent magnets. In some X-ray CT apparatus, however, an X-ray tube is rotated about a man's body. In this case, application of radial forces to the rotor in directions normal to the axis of the rotor is inevitable.

In the prior art rotary anode X-ray tube as described above, the magnetic path through which the magnetic flux produced from the permanent magnet passes, passes through the rotor to return to the magnet. The path includes comparatively large gaps, i.e., comparatively high magnetic reluctance portions. These gaps cause much flux leakage making it difficult to hold the rotor stably in the axial direction with only the permanent magnets. Comparatively large currents must be supplied to the electromagnets to make up for the insufficient force of the permanent magnets in order to hold stably the rotor in the axial direction.

In the above prior art rotary anode X-ray tube the permanent magnets and electromagnets are disposed on the outer side of a casing accommodating the rotor, which is undesirable when trying make the X-ray tube compact. The rotor is also sealed in the casing, and heat transferred to the rotor from the rotary anode is cooled only by high temperature radiation cooling from outside of the rotor reducing cooling efficiency.

SUMMARY OF THE INVENTION

An object of the invention is to provide a rotary anode X-ray tube which can save power consumption for stably holding the cylindrical drive shaft of the rotary anode, is compact in construction, has high cooling efficiency and is highly reliable.

According to the invention, this object is attained by a rotary anode X-ray tube, which comprises a hollow cylindrical rotor made of a non-magnetic material having one end closed by an end plate and having the other end open, a conductive drive shaft secured to said closing plate and having an outwardly projecting portion coaxial with the rotor and projecting from the closing plate, a rotary anode secured to the end of the projecting portion, a cathode disposed to face a rotating peripheral surface of the rotary anode, at least one ring member made of a ferromagnetic material provided on the inner wall of the rotor, an evacuated casing made of a material other than a ferromagnetic material including an outer tube covering the cathode, rotary anode and outer periphery of rotor and having an X-ray emission window and an inner tube covering the inner periphery of the rotor and united by a uniting portion covering the open end of the rotor to the outer tube, at least one permanent magnet magnetized in the radial direction of the rotor and having one of the opposite pole sides in contact with the inner periphery of the inner tube, a yoke provided on the inner periphery of the inner tube and in contact with the outer second poles found on the opposite ends of the permanent magnet along the axial direction of the rotor, with the second pole corresponding in position to one of the opposite ends of the ring member, a control winding wound on at least one of the first and second poles, and means for giving a rotational driving force to the rotor.

DETAILED DESCRIPTION OF THE PREFERRED EMBODIMENT

Figure 1:
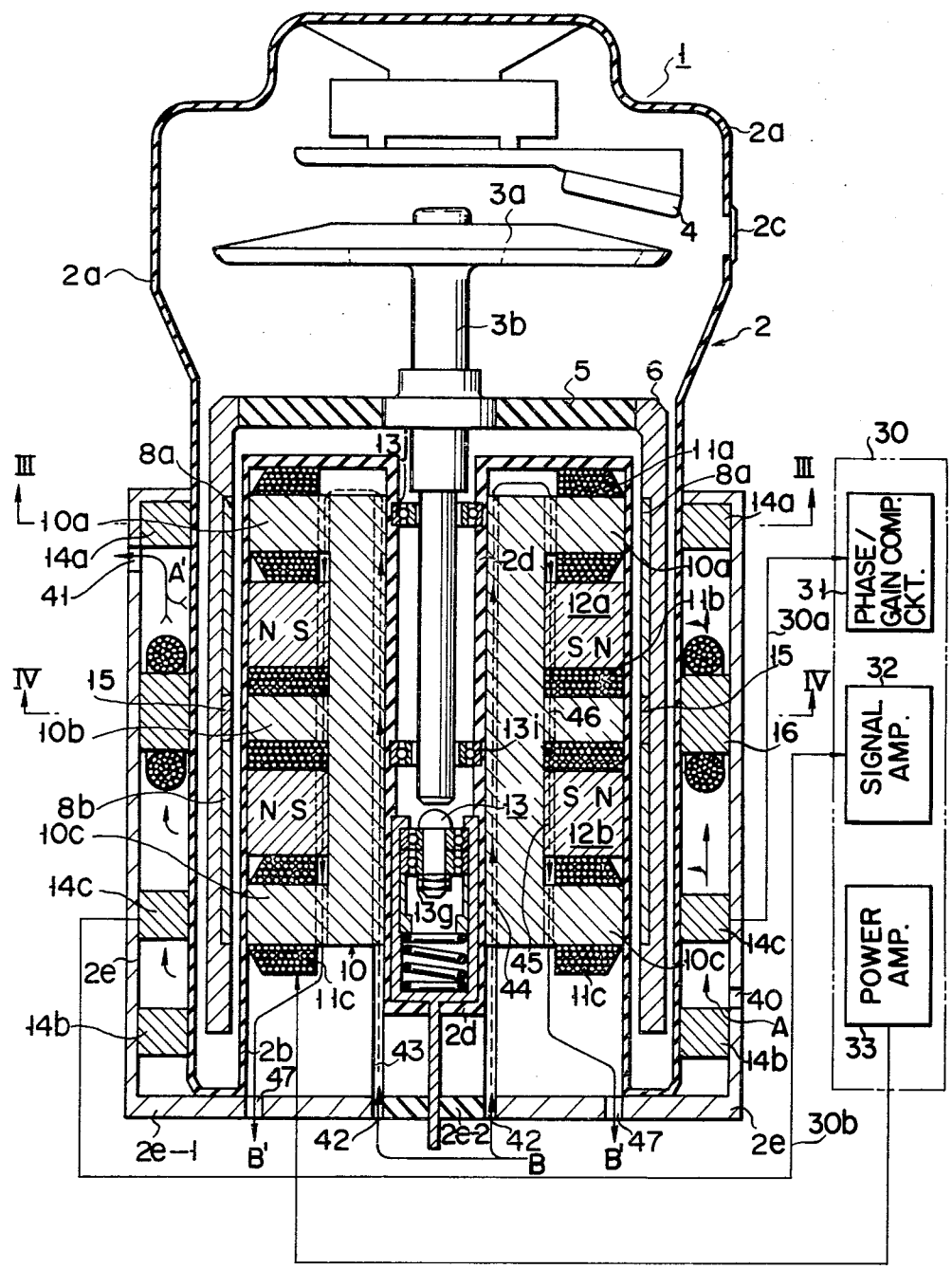
FIG. 1 is an axial sectional view showing one embodiment of the rotary anode X-ray tube according to the invention.

FIG. 1 shows a rotary anode X-ray tube. The tube comprises an evacuated casing 2. The casing 2 includes an outer tube 2a and an inner tube 2b which is united in an airtight manner to the outer tube 2a at the lower end and extending in the same. The outer tube 2a has an X-ray emission window or opening 2c formed in an upper end portion of its peripheral wall. The evacuated casing 2 is made of a material other than a ferromagnetic material, such as glass or ceramic which has a high heat radiation efficiency for cooling, as will be described in detail later. A rotary anode 3a is disposed in the outer tube 2a. The rotary anode 3a corresponds to the X-ray emission window 2c, and is secured to one end of a conductive shaft 3b. A cathode 4 is disposed with its electron emission surface in the vicinity of the X-ray emission surface of the rotary anode 3a. The cathode 4 hermetically extends into the outer tube 2a from the top center thereof.

The shaft 3b coaxially penetrates a ring-like insulating plate 5 and is supported by the same. The insulating plate 5 is a good heat conductor and serves as a lid closing one open end of a hollow cylindrical rotor 6. The rotor 6 is made of a material other than a ferromagnetic material. Its major substantial portion extends in a space defined between the outer and inner tubes 2a and 2b and is spaced apart at predetermined distances from these inner and outer tubes 2a and 2b.

Figure 2:
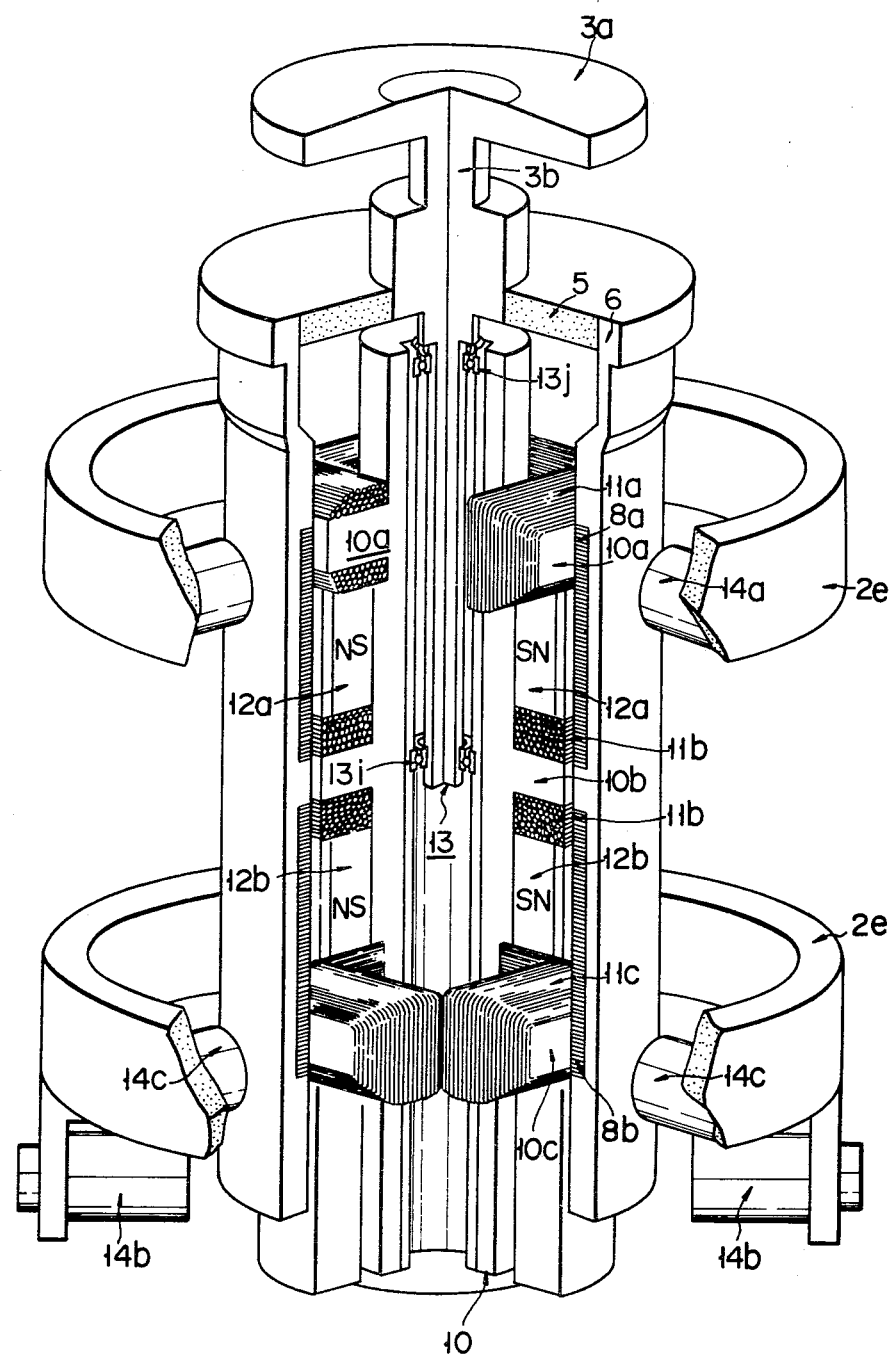
FIG. 2 is a perspective view showing the embodiment of FIG. 1.

The inner periphery of the rotor 6 is provided with a pair of rings 8a and 8b. The rings 8a and 8b are made of a ferromagnetic material, such as 3% silicon steel, and spaced apart a predetermined distance. As shown in FIG. 2, the rings 8a and 8b each consist of a plurality of silicon steel ring elements, with a thickness of 0.5 mm for example, which are laminated in the axial direction of the rotor 6. This laminated structure prevents current flow caused by the eddy current through the rings 8a and 8b, thus reducing power loss. FIG. 2 is a perspective view showing the X-ray tube of FIG. 1, with the case and cathode 4 omitted for the sake of simplicity. The rotor 6 has a form as shown in FIG. 2, and in FIG. 1 it is shown in a slightly simplified form.

The portion of the shaft 3b, that extends into the rotor 6, is inserted in a hollow cylindrical projection 2d projecting from the center of the upper closed end of the inner tube 2b. A hollow cylindrical yoke 10 is inserted in a space defined between the inner tube 2b and central projection 2d. The yoke 10 has poles 10a, 10b and 10c formed at its upper end, middle and lower end portions respectively. The poles 10a and 10c face the respective rings 8a and 8b, while the middle pole 10b faces a portion 15 made of a conductive material provided between the rings 8a and 8b. Coils 11a, 11b and 11c are wound on the respective poles 10a, 10b and 10c. Ring-like permanent magnets 12a and 12b are provided on the outer periphery of the yoke 10 between the poles 10a and 10b and between the poles 10b and 10c respectively. These permanent magnets 12a and 12b are magnetized in the radial direction of the rotor 6 so that their N pole, for instance, is formed on the side facing the rings 8a and 8b. The coils 11a to 11c form electromagnetic fluxes which can control the magnetic fluxes between the pole 10a and the ring 8a, the pole 10b and the ring 8b respectively which are served by permanent magnets 12a and 12b. These coils are connected to a power supply (not shown).

Figure 3:
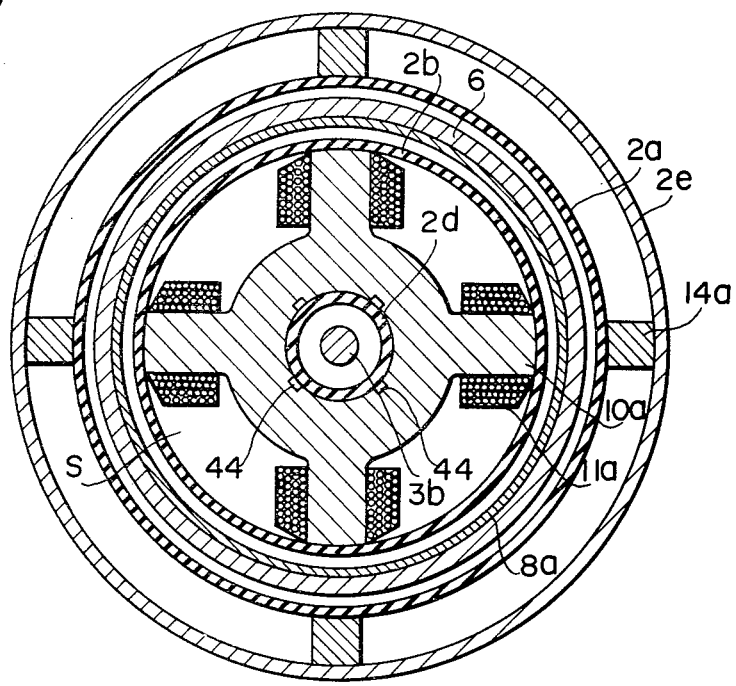
FIGS. 3 and 4 are transversal sectional views taken along lines III—III and IV—IV in FIG. 1, respectively.

In this embodiment, the poles 10a and 10c are each constituted of four poles which are radially and uniformly spaced apart by an angle of 90 degrees, as shown in FIGS. 2 and 3. The pole 10b, on the other hand, is a single ring-like pole.

Figure 5:
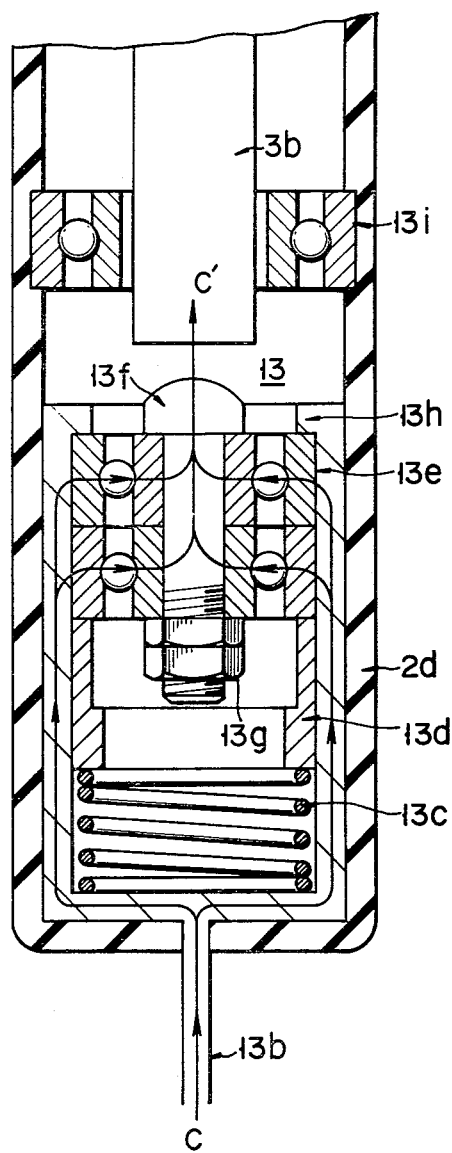
FIG. 5 is an axial sectional view showing an anode current lead contact mechanism in FIG. 1.

The central hollow projection 2d of the inner tube 2b accommodates a contact mechanism 13 as shown in FIG. 5. The contact mechanism 13 includes a lining conductor 13a which is formed on the inner wall of the hollow cylindrical central projection 2d. The lower end of the lining conductor 13a is connected to a lead conductor 13b, which hermetically penetrates the bottom of the central projection 2d. In the lining conductor 13a, a coil spring 13c, a spacer 13d and a conductive ball bearing 13e are disposed. The coil spring 13c is interposed between the bottom of the lining conductor 13a and the spacer 13d, which supports the ball bearing 13e on top of it. The ball bearing 13e supports a coaxial contact piece 13f penetrating it and mounted in it by doubled nuts 13g. The top of the ball bearing 13e is urged by the coil spring 13c, against a stopper 13h which is integral with the lining conductor 13a. The upper end of the contact piece 13f faces the lower end of the shaft 3b integral with the rotor 6. The lower end of the shaft 3b is spaced apart at a predetermined distance from the top of the contact piece 13f, when the rotor 6 is supported in contactless magnetic bearings, as will be described later in detail. An auxiliary ball bearing 13i is provided on the inner wall of the central projection 2d. The auxiliary ball bearing 13i corresponds in its location to the lower end portion of the shaft 3b and is spaced apart at a predetermined distance from the stopper 3h. It serves to provide for tentative support of the shaft 3b in case of trouble in the contactless magnetic bearings. For the same purpose, another auxiliary ball bearing 13j is provided on the inner wall of the central projection 2d to face a portion of the shaft 3b near the rotary anode 3a. When X-ray is generated, the tip of the shaft 3b is contacted with the contact piece 13f, current flows as shown by an arrow C-C'.

Displacement detectors 14a, 14b and 14c are provided on the outer wall of the tube 2 at locations corresponding to the respective poles 10a, 10b and 10c. These displacement detectors 14a, 14b and 14c serve to detect the displacement or the rate of the displacement of the rotor 6 in the axial directions. Their outputs are led through a pair of leads 30a and 30b to a phase/gain compensation circuit 31 in a detecting circuit 30. The output of the phase/gain compensation circuit 31 is pre-amplified by a signal amplifier 32 and then amplified by a power amplifier 33 to be fed back to, for instance, the coil 11c. There are various well-known detecting circuits of this kind; for instance, the servo means disclosed in U.S. Pat. No. 3,860,300 may be used.

In this embodiment, a brushless induction motor is used as a driver for rotating the rotor 6. The brushless induction motor includes the copper ring 15, which is provided in the respective part of rotor, for example, in the inner wall of the rotor 6, and a stator 16 which is mounted on the outer wall of the outer tube 2a to face the copper ring 15 via the rotor 6. The stator 16, as well as the detectors 14a to 14c, are supported by a cylindrical support 2e in their state mounted on the outer wall of the outer tube 2a. The cylindrical support 2e has a bottom 2e-1 which supports a uniting portion uniting the outer and inner tubes 2a and 2b from below in FIG. 1. The bottom 2e-1 has a central insulator 2e-2, and the lead conductor 13b leading from the rotary anode 3a penetrates the center of the insulator 2e-2 to the outside.

A cooling system used in this embodiment will now be described with reference to FIGS. 1 to 4. As shown in FIG. 1, first cooling medium path has an entrance 40 formed in the peripheral wall of the cylindrical support 2e. The entrance 40 is connected with a cooling medium source (not shown). The cooling medium, for instance insulating oil, that has been led to the entrance 40, enters the interior of the cylindrical support 2e and is forced to flow through the space between the cylindrical support 2e and outer tube 2a and past the detectors 14a to 14c and stator 16 to be discharged through an exit 41, as shown by arrows A-A'. Heat generated as a result of the bombardment of the rotary anode 3a by the electrons from the cathode 4, is conducted through the shaft 3b, insulator 5 and rotor 6, and thence transmitted by radiation to the outer tube 2a. The transmitted heat is carried away by the cooling medium, which is flowing from the entrance 40 to the exit 41, to the outside of the tube 1.

Figure 4:
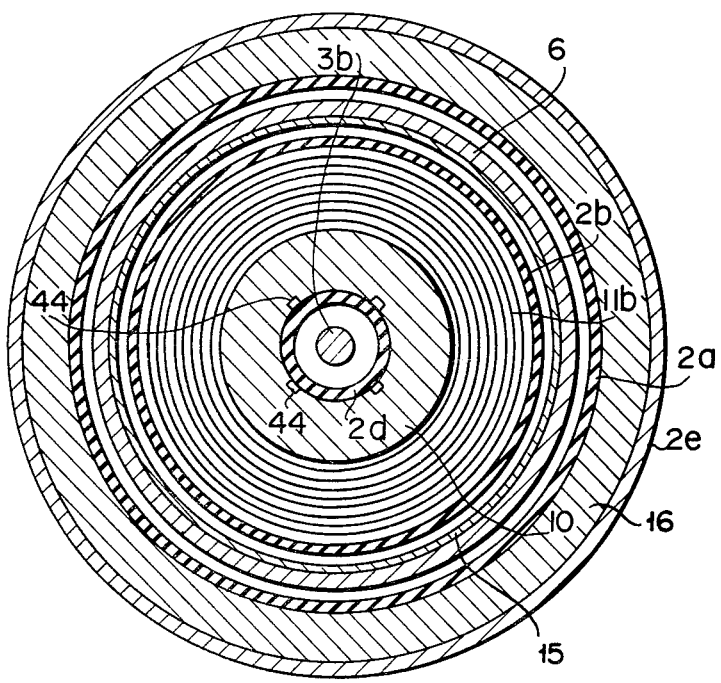

Meanwhile, heat conducted through the shaft 3b and rotor 6, and thence, transmitted to the inner tube 2b, yoke 11 and permanent magnets 12a and 12b, is carried away by a cooling medium which is forced to enter the interior of the cylindrical support 2e from entrances 42 provided in the bottom 2e-1 and flow through conduits 44 formed in the yoke 11, as shown by arrows B. The cooling medium is led into the spaces surrounding the poles 10a and 10c and thence, through conduits 45 formed in the permanent magnets 12a and 12b, and also through conduits 46 formed in the pole 10b, to be discharged through exits 47 provided in the bottom 2e-1, as shown by arrows B'. The entrances 42 may be connected with the same cooling medium sources as for the entrance 40. FIGS. 3 and 4 are sectional views taken along respective lines III—III and IV—IV in FIG. 1. In these Figures, the cooling medium conduits are clearly shown.

Figure 6:
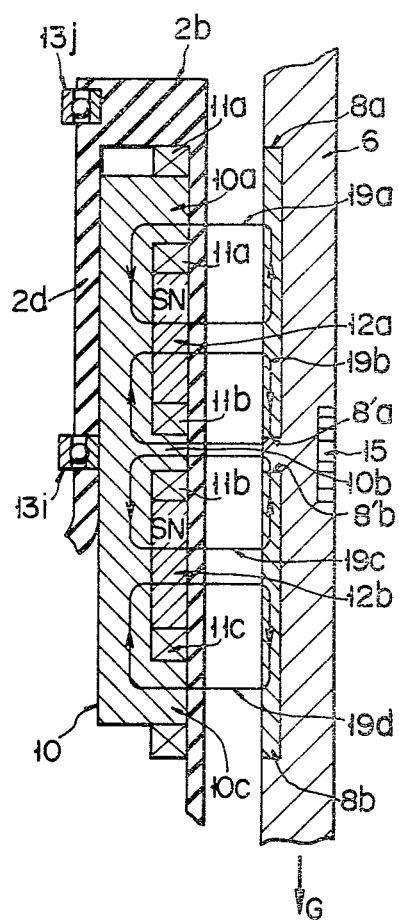
FIGS. 6 and 7 are views for explaining the operation of the embodiment of FIG. 1.

The operation of the embodiment shown in FIG. 1 will now be described with reference to FIG. 6. As shown in FIG. 6, the magnetic flux produced from the permanent magnet 12a enters the ring 8a, which is provided in the inner wall of the rotor 6 and is made of a ferromagnetic material, in a direction at right angles to the axis of the rotor 6. Part of the flux proceeds through the ring 8a in a direction parallel to the rotor axis. This flux then emerges from the ring 8a at a position corresponding to the poles 10a to proceeds toward these poles, i.e., in a direction at right angles to the rotor axis. Then it enters the yoke 10 and proceeds through the same to enter permanent magnet 12a from the S pole side thereof. The closed magnetic path described above is indicated by 19a. The other part of the flux entering the ring 8a emerges from the end face of the ring 8a, and passes through the flange-like pole 10b formed on the outer periphery of the yoke 10 to return to the S pole side of the permanent magnet 12a. This closed magnetic path is indicated by 19b. Likewise, two typically different closed magnetic paths 19c and 19d are formed with the other permanent magnet 12b. Meanwhile, the coils 11a, 11b and 11c which are wound on the respective poles 10a, 10b and 10c as mentioned earlier, may be furnished with currents supplied from a control section (not shown) so that they may produce fluxes. These fluxes may be superimposed upon the fluxes from the permanent magnets 12a and 12e in the forward or reverse direction to increase or reduce the fluxes passing through the closed magnetic paths 19a and 19d.

With the fluxes produced to pass through the closed magnetic paths 19a to 19d as shown in FIG. 6, the poles 10a and ring 8a experience magnetic forces of attraction to one another in the radial directions of the rotor 6, and also the poles 10c and ring 8b experience similar radial magnetic attraction forces. As mentioned earlier and as shown in FIG. 2, the poles 10a and 10c are each constituted of four poles, which are radially and uniformly spaced apart by an angle of 90 degrees and radially extend from the main portion of the yoke 10 toward the rotor 6. Thus, if external forces and the magnetic forces of attraction between the four poles 10a and ring 8a and the magnetic forces of attraction between the four poles 10c and ring 8b are balanced, the rotor 6 is stably held in position in the direction normal to its axis by the magnetic bearings.

Meanwhile, the magnetic fluxes from the permanent magnets 12a and 12b and pass through the closed magnetic paths 19a and 19b, emerge from the rings 8a and 8b from the ends facing each other, to enter the flange-like pole 10b. The end faces 8a' and 8b' of the rings 8a and 8b that face each other are formed to extend normal to the axis of the rotor 6. Thus, the fluxes that emerge from the end faces 8a' and 8b' of the rings in the magnetic paths 19b and 19c are parallel to the axis of the rotor 6 and have opposite directions. For this reason, magnetic forces act between the pole 10b and rings 8a and 8b in opposite directions parallel to the axis of the rotor 6. If summation of the two opposing magnetic forces in the axial direction of the rotor and the external forces are equal in magnitude, the rotor 6 will be stably held in position in its axial direction. Driving the copper ring 15 by generating a rotating magnetic field in the stator 16, results in the rotor 6 being stably rotated at a high speed of 20,000 r.p.m. or up, for instance at while it being held in a fixed position by the contactless magnetic bearings.

In actual practice, the rotary anode X-ray tube can be used in any position including, for example, an upright, lateral and upside-down position and the direction in which an external force acts on the rotor varies. Therefore, in order to realize a stable support, a magnetic flux passing through the magnetic pole in the direction of the external force may be so adjusted as to permit an influence from the external force to be cancelled. Suppose, for example, that in the gravitational field the X-ray tube is in the exactly upright position as shown in FIG. 6. In this case, a magnetic flux entering the magnetic pole 10b through the magnetic path 19b is decreased, while a magnetic flux entering the magnetic pole 10b through the magnetic path 19c is increased. In general, in the respective magnetic poles the following phenomenon occurs. That is, a magnetic flux passing through the magnetic pole located in the direction of the external force acting on the rotor 6 is decreased and a magnetic flux passing through the magnetic pole located in the direction of an opposing external force is increased, thereby cancelling the influence from the external force.

The displacement or its displacement speed of the rotor 6 in the axial direction and in the direction normal thereto, is detected by the displacement or speed detectors 14a to 14c. The control section controls the magnitude and direction of currents supplied to the coils 11a to 11c so as to compensate for the detected displacement or the speed. For example, in case of detecting the displacement a signal from the detector 14c, representing a displacement of the rotor 6 in a direction normal to the rotor axis, is led to and processed in the phase/gain compensation circuit 3. The output of the circuit 3 is coupled through the signal amplifier 32 and power amplifier 33 to obtain a control current of a predetermined magnitude. This control current is supplied to the coil 11c to control the flux passing through the pole 10c. Such a control circuit 30 is provided for each of the coils 11a to 11c so that the rotor 6 can be stably held in a fixed position. The point of focus of X-rays emitted from the tube 1 can be controlled by supplying predetermined currents to the coils 11a to 11c. When emitting X-rays, it is necessary to apply a higher voltage compared with the cathode to the rotary anode 3a from the lead conductor 13b through the contact piece 13f. To this end, the force by which the rotor 6 is held in a position in the axial direction is controlled by controlling the current flowing through the coil 11b so that the lower end of the shaft 3h is in contact with the contact piece 13f.

The number, shape and polarity of permanent magnets, which are mounted in the yoke 10 and magnetized in a direction normal to the axis of the rotor 6, may be suitably changed.

Also, the brushless induction motor, which comprises the copper ring 15 and stator 16, may be disposed at any location so long as it can supply torque to the rotor 6. Further, where the rotor 6 is made of a conducting metal, the copper ring 15 may be dispensed with. In this case, considering a rotational speed in excess of 20,000 r.p.m., the rotor 6 is desirably made of a metal such as titanium alloy which provides high mechanical strength against centrifugal forces and is light in weight.

As has been shown, the permanent magnets 12a and 12b are adapted to provide magnetic forces in the axial and radial directions of the rotor 6 so that the axial magnetic force can cancel the external forces such as gravitational forces exerted on the rotor 6. Thus, the rotor 6 can be supported by the contactless magnetic bearings, which are provided by the sole permanent magnets 12a and 12b. That is, currents are caused to pass through the coils 11a to 11c only when moving the rotor in the axial direction, and requires very little power.

Figure 7:
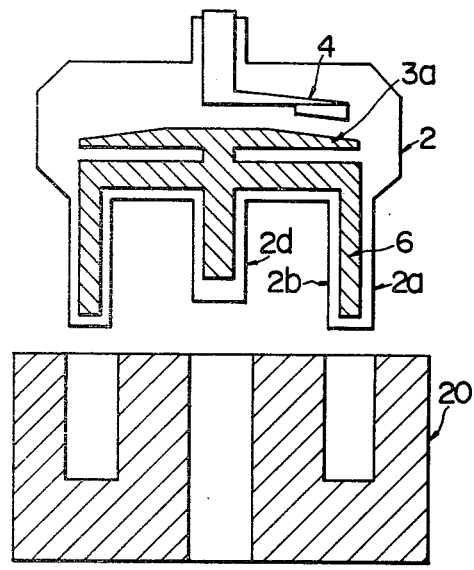

The evacuated casing 2 covers the outer and inner surfaces of the hollow cylindrical rotor 6, as shown in FIG. 7. Therefore, the outer tube 2a of the casing 2, covering the outer surface of the rotor 6, experiences inward forces so that it must have sufficient thickness. On the other hand, the inner tube 2b experiences outward forces so that it requires relatively little thickness. This means that the magnetic reluctance of the magnetic paths 19a to 19d may be reduced so that the fluxes from the permanent magnets 12a and 12b can be effectively coupled to the rotor 6. In addition, the tube 1 can be reduced in weight and size, and cooling efficiency is increased.

As is shown in FIG. 7, a portion of the tube 1 which provides for the contactless magnetic bearings, is disposed on the outer side of the casing 2. Thus, the heat, generated in the rotary anode 3a can be effectively transfered through the rotor 6 to the portion 20, to be effectively dissipated by the cooling system shown in FIG. 1. Since a high cooling efficiency is obtained, the X-ray emission period can be extended without increasing the rotational speed of the rotary anode 3a. Further, it is possible to reduce wear of the contact mechanism 13 and restrict the increase in the power consumption due to increased rotational speed. Since the contact piece 13f of the contact mechanism 13 has a spherical top so that it will be in point contact with the lower end of the shaft 3b and since it is also supported via the ball bearing 13e and spring 13c, it is not substantially worn at all.

Figure 8:
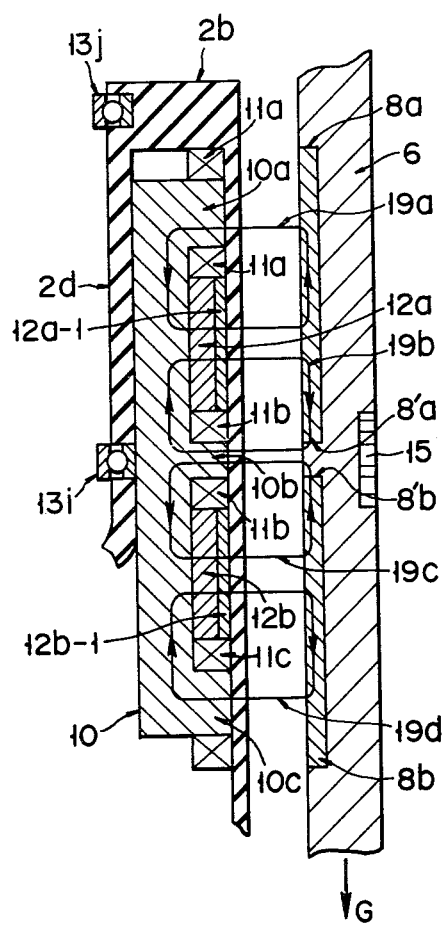
FIG. 8 is a fragmentary sectional view showing another embodiment of the rotary anode X-ray tube.

FIG. 8 is a fragmentary sectional view showing a different embodiment of the invention. In this embodiment, the outer side of permanent magnets 12a and 12b is covered by respective ring members 12a-1 and 12b-1 made of a ferromagnetic material. For the rest, the embodiment is the same as the preceding embodiment of FIG. 1, and like parts are designated by like reference numerals or symbols and are not described any further.

The ring members 12a-1 and 12b-1 help restoring rotor 6 when the same is displaced. This will now be described in detail with reference to FIGS. 9A to 9C.

Figure 9A:
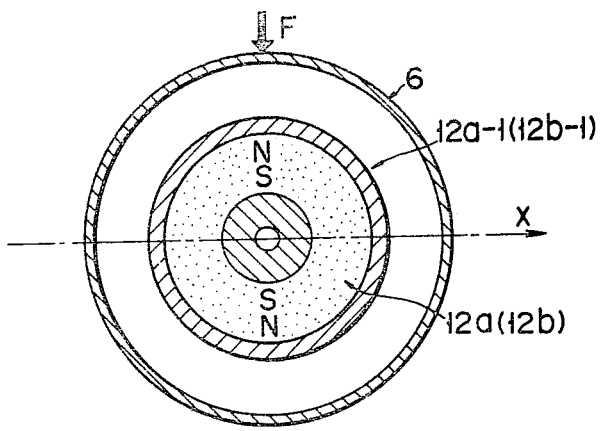
FIGS. 9A to 9C are transversal sectional views for explaining the operation of the embodiment of FIG. 8.
Figure 9B:
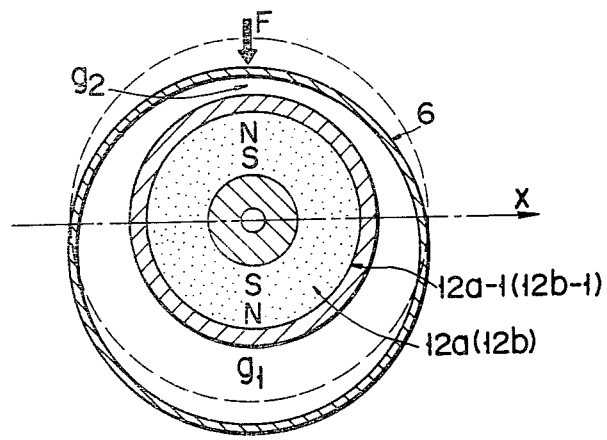
Figure 9C:
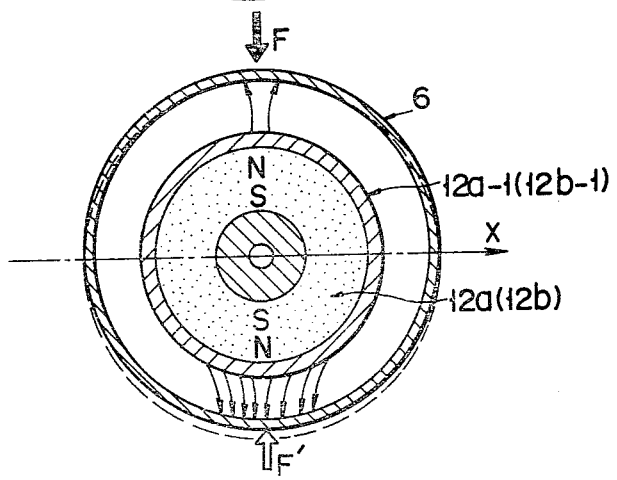

When the rotor 6, which is kept rotating in its proper position, as shown in FIG. 9A, experiences an external force F, the balance between the rotor 6 and the stationary side magnetic force which provides a support system for the rotor 6 by magnetic forces, is lost. As a result, an increased magnetic gap portion g1 and a reduced magnetic gap portion g2 are formed between the two, as shown in FIG. 9B. When this out-of-balance state occurs, the rotor stabilizing system is operated by the output of detectors (not shown) corresponding to the displacement detectors 14c and 14b in FIG. 1. The rotor stabilizing system supplies a current to a coil 11c which is found on the side of the increased magnetic gap, to increase the magnetic flux from the corresponding pole, and also supplies a current to a coil 11c which is on the reduced magnetic gap side, to reduce the flux from the corresponding pole (see FIG. 2). In the increased gap portion, the magnetic forces of attraction are increased while in the reduced gap portion, the magnetic attraction forces are reduced. Due to this difference in magnetic attraction forces, the rotor 6 is displaced in a very short period of time to a position in which the external force F is off-set by the difference in magnetic forces. As soon as this off-set position is reached, the rotor stabilizing system discontinues the current supply to the coils 11c. Subsequently, the rotor 6 is supported solely by the magnetic forces of the permanent magnets 12a and 12b. As is shown, when the rotor 6 is deflected by the external force F, the rotor stabilizing system supplies currents to the control coils 11c by fully following the instantaneous changes in the external force. The rotor 6 thus can be momentarily restored to its proper position in which the external force F is off-set by the difference in the magnetic forces. At this time, the ferromagnetic ring members 12a-1 and 12b-1 effectively collect most of the fluxes emerging from the outer surface of the permanent magnets 12a and 12b. That is, concentrated fluxes from portions of the ferromagnetic ring members that correspond to the smallest magnetic gap portion can proceed to the inner surface of the corresponding rings 8a and 8b. Thus, the magnetic forces of attraction are intensified for the smallest magnetic gap portion while they are reduced that much for the diametrically opposite portion. The rotor 6 tends to be brought to a position in which the external force F is balanced by the resultant F' of the magnetic attraction forces provided by the permanent magnets.

The ferromagnetic ring members mounted on the outer periphery of the permanent magnets thus can promote the efficiency of the flux concentration in the least magnetic gap portion so that effective magnetic attraction forces by the permanent magnets to cope with the external force can be obtained. This means that the displacement of the rotor 6 when it experiences an external force can be reduced. In other words, magnetic bearing stiffness can be improved. The same magnetic bearing stiffness can be obtained with permanent magnets of a reduced diameter. Further, the rings 8a and 8b as well as the yoke 10 can be reduced in size so that it is possible to obtain a compact X-ray tube. Also, since magnetic bearing stiffness can be improved, the displacement of the rotor 6 when an external force is exerted to it, can be reduced; that is, the coils may be energized by the rotor stabilizing system for a reduced period of time. Thus, it is possible to save power as well as to effectively utilize the magnetic forces of the permanent magnets.

Figure 10:
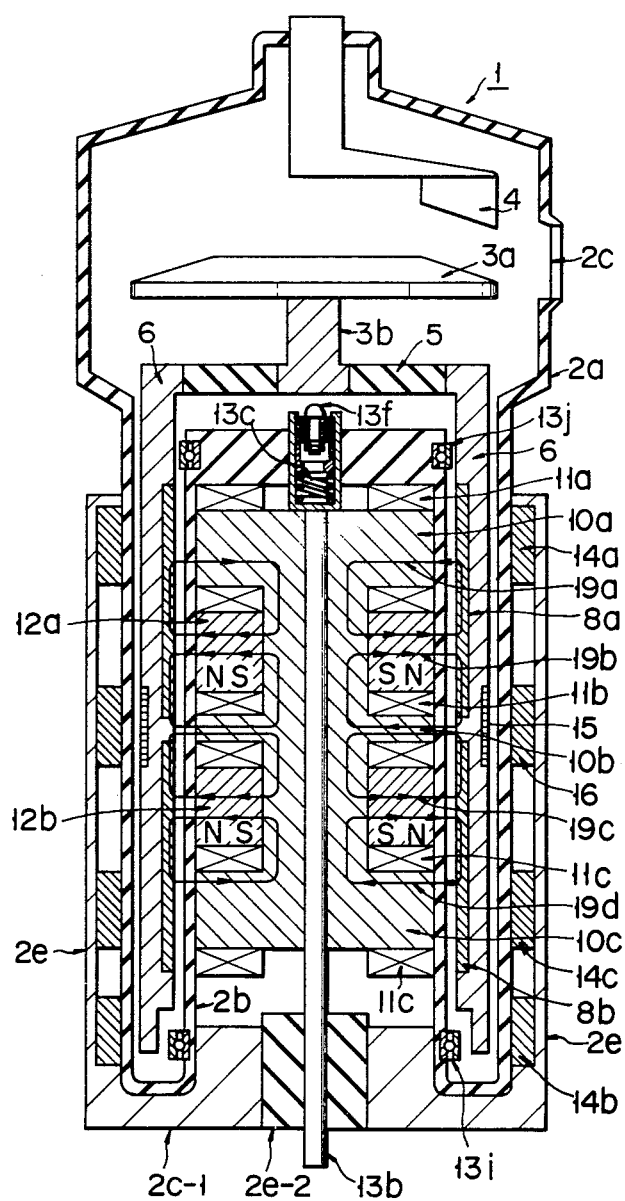
FIGS. 10, 11, 12 and 13 are axial sectional views showing further embodiments of the rotary anode X-ray tube according to the invention.

FIG. 10 shows a further embodiment. The same parts as those in the embodiment of FIG. 1 are designated by like reference numerals or symbols and are not described any further. This embodiment is different from the embodiment of FIG. 1, in that the shaft 3b of the rotary anode 3a has a reduced length and constitutes, together with an insulating closing plate 5, the closed end of hollow cylindrical rotor 6. Mechanical bearings 13i and 13j are provided on the outer periphery of inner tube of casing 2 covering the inner periphery of the rotor 6.

With this construction, the thickness of the hollow yoke 10 can be increased. In other words, the magnetomotive force of permanent magnets 12a and 12b, which are provided as the source of magnetic forces for the magnetic bearings inside the hollow cylindrical rotor 6, can be increased to increase the magnetic forces without increasing the outer size of the rotary anode X-ray tube 1 by using the permanent magnets of more energy-product.

Figure 11:
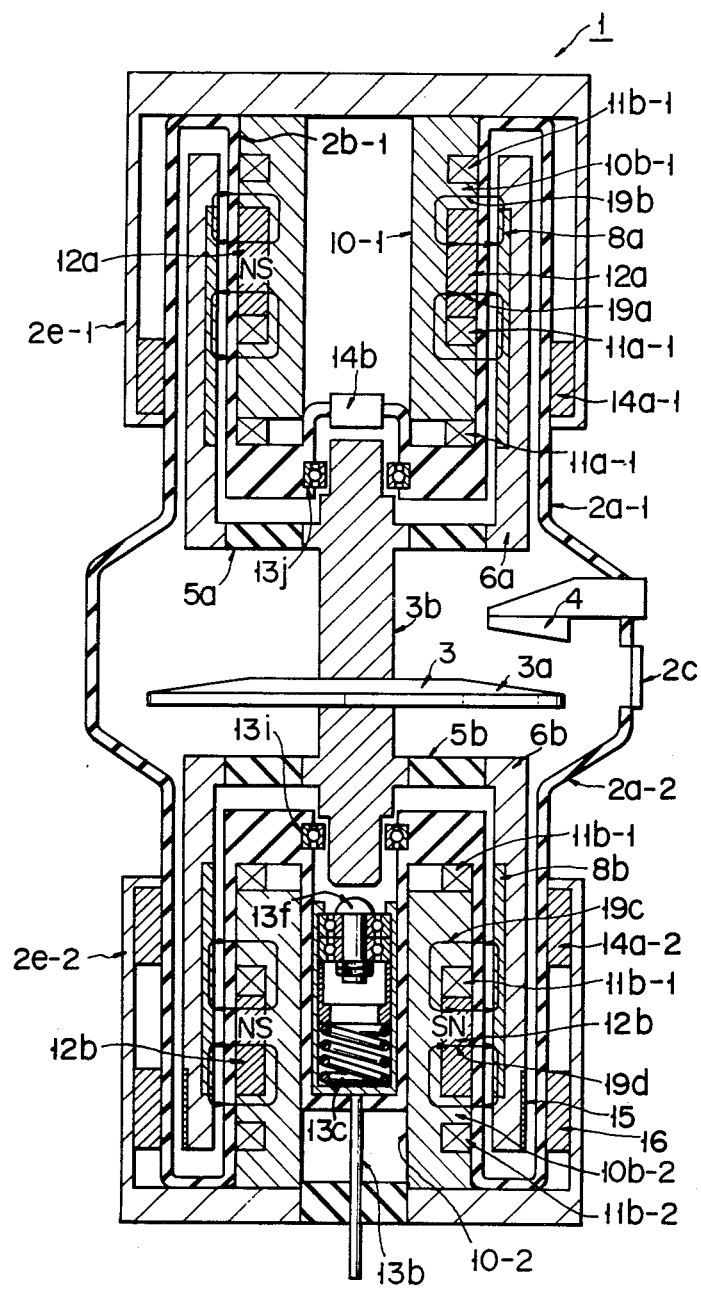

FIG. 11 shows a further embodiment. The same parts as those in FIG. 1 are again designated by like reference numerals or symbols and are not described any further. In this embodiment, hollow cylindrical rotors 6a and 6b are provided on the opposite sides of rotary anode 3a. Casing 2 is formed to enclose these rotors 6a and 6b. Ring-like permanent magnets 12a and 12b are provided on portions of the yokes 10-1 and 10-2 corresponding to the ferromagnetic rings 8a, 8b provided with the inner periphery of the rotors 6a, 6b. While in this embodiment the hollow cylindrical yokes 10-1 and 10-2 have a considerable inner diameter and mechanical bearings 13i and 13j are provided for tentative support on the inner periphery of hollow cylindrical projections projecting from the end of inner tubes of the casing 2. In this embodiment, a detector 14b, which detects the axial displacement of the rotors 6a and 6b, and hence the axial displacement of the shaft 3b, is provided on the closed end of the projecting portion projecting from the closed end of the inner tube covering the inner periphery of the rotor 6a.

In the rotary anode X-ray tube 1 described above, the shaft 3b of the rotary anode 3a is supported at its opposite ends so that very stable rotation can be obtained.

Figure 12:
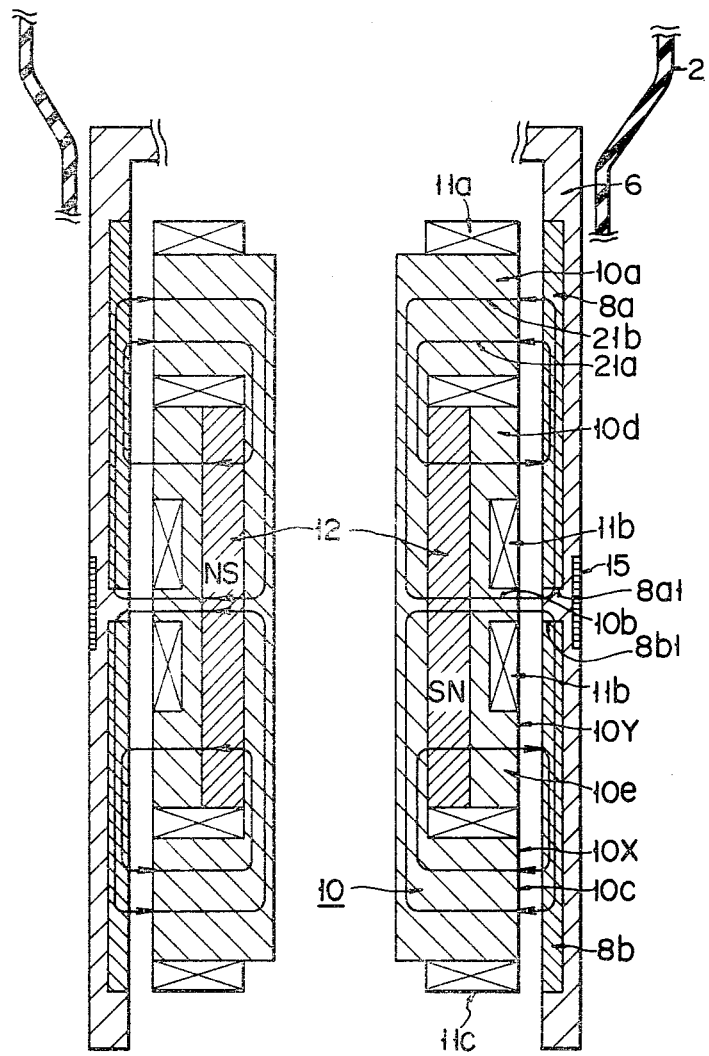

FIG. 12 shows a further embodiment. In the Figure, only parts having to do with magnetic fluxes from permanent magnet and electric magnet as the sources of magnetic forces are shown. Again the same parts as those in FIG. 1 are designated by like reference numerals or symbols and are not described any further. This embodiment uses a permanent magnet 12 which, unlike the permanent magnets in the embodiment of FIG. 1, is comprised of a single ring-like permanent magnet. The permanent magnet 12 is mounted on the outer periphery of a yoke 10, and a yoke 10X is mounted on the outer periphery of the permanent magnet 12. The yoke 10X is provided with poles 10a and 10c and first coils 11a and 11c. These yokes and coils contribute to the stability of rotor 6 in the radial directions as described earlier in connection with FIG. 1. The yoke 10Y is provided with a pole 10b, a second coil 11b and poles 10d and 10e. The poles and coil here contribute to the stability of the rotor 6 in the axial direction thereof as described earlier in connection with FIG. 1. They also serve the role of switches between the anode current lead contact piece 13f and the shaft 3b. The permanent magnet 12 is magnetized so that its flux proceeds in directions normal to the axial direction of ferromagnetic rings 8a and 8b on the rotor 6. Thus, the flux from the permanent magnet 12 passes through closed magnetic paths for the magnetic bearings without substantial leakage. More particularly, part of the flux from the permanent magnet 12 proceeds from the pole 10d to enter the ferromagnetic ring 8a from the inner periphery thereof, and then it returns to the magnet 12 through the pole 10a. This closed magnetic path is designated by 21a. Another part of the flux from the magnet 12 proceeds from the ring-like pole 10b and enters the ring 8a from the end face $8a_1$ thereof, and then it returns to the magnet 12 through the pole 10a. This magnetic path is designated by 21b. The first coil 11a increases or reduces the flux at the pole 10a for increasing or reducing the magnetic attraction forces between the pole 10a and ring 8a. The same operation is obtained for the pole 10c, which is symmetrical with the pole 10a with respect to the yoke 10X and has the same shape as the pole 10a. The poles 10a and 10c together with the first coils 11a and 11c, contribute to the stability of the rotor 6 in the radial directions thereof. The same effects are obtained with the poles 10a and 10c that are mounted and magnetized in the direction normal to the plane of paper as well. The second coil 11b serves to increase or reduce the flux at the end faces $8a_1$ and $8b_1$ of the ferromagnetic rings 8a and 8b. The ring-like pole 10b together with the second coil 11b contribute to the stability of the rotor 6 in the axial direction thereof.

Figure 13:
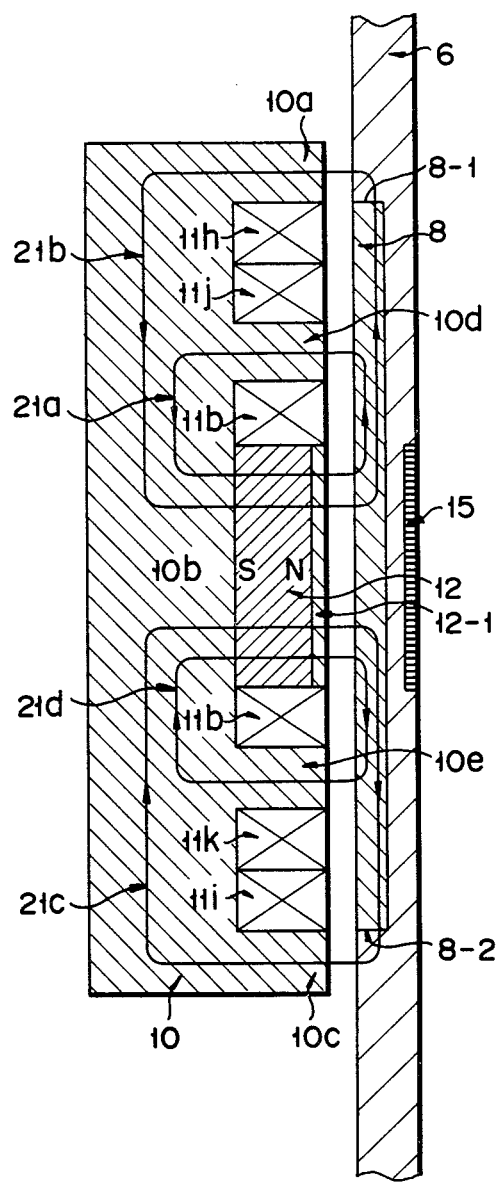

FIG. 13 shows a still further embodiment. In this Figure, only parts having to do with magnetic fluxes from a permanent magnet and electric magnets as the sources of magnetic forces are shown. The portions corresponding to those of FIG. 12 are designated by like reference numerals.

A single ring-like permanent magnet 12 is mounted on the outer periphery of a yoke 10 which is provided with magnetic poles 10a, 10b, 10c, 10d and 10e. End surfaces of these poles 10a to 10e are provided to face the inner surface of a single ring-like ferromagnetic member 8 provided on the inner surface of a rotor 6. On the outer surface of the rotor 6 corresponding to the permanent magnet 8 is provided a copper ring 15 for rotating the rotor 6. The inner edges of the poles 10a and 10c are aligned with the side edges 8-1, 8-2 of the ferromagnetic ring 8. Coils 11b, 11h to 11k are wound about the poles 10a to 10e to adjust the magnetic fluxes passing through the magnetic paths 21a to 21d as shown in FIG. 13.

The magnetic fluxes passing through the paths 21a and 21d are generated from N pole of the magnet 12 and enter into the ferromagnetic ring 8 to return into the poles 10d and 10e. Therefore, magnetic attraction forces in the radial direction of the rotor axis are generated between the poles 10d, 10e and the ferromagnetic ring 8.

While, magnetic fluxes passing through the magnetic paths 21b and 21c come out of the end portions 8-1, 8-2 of the ring 8 in the opposite directions along the rotor axis and enter into the poles 10a and 10c, respectively. As a result, opposed magnetic attraction forces in the radial direction of the rotor axis are generated between the poles 10a and 10c and the ring edges 8-1, 8-2.

What we claim is:
1. A rotary anode X-ray tube comprising:
a hollow cylindrical rotor made of a material other than a ferromagnetic material having one end closed by a closing plate and having the other end open;

a conductive shaft member secured to said closing plate and having an outwardly projecting portion coaxial with said rotor and projecting from said closing plate;

a rotary anode secured to said projecting portion;

a cathode disosed to face a rotating peripheral surface of said rotary anode;

at least one ring member made of a ferromagnetic material provided on the inner periphery of said rotor;

an evacuated casing made of a material other than a ferromagnetic material including an outer tube covering said cathode, rotary anode and outer periphery of rotor and having an X-ray emission window and an inner tube covering the inner periphery of said rotor and united by a uniting portion covering the open end of said rotor to said outer tube;

at least one permanent magnet magnetized in the radial direction of said rotor and having one of the opposite pole sides, i.e. N and S magnetic poles, in contact with the inner periphery of said inner tube;

a yoke provided inside said inner tube and in contact with the other pole end of said permanent magnet, said yoke having first and second poles provided on the inner periphery of said inner tube corresponding to the opposite sides of said permanent magnet in the axial direction of said rotor, said second pole corresponding to one of the opposite ends of said ring member;

a control winding wound on at least one of said first and second poles; and means for giving a rotational driving force to said rotor.

2. The rotary anode X-ray tube according to claim 1, wherein said evacuated casing is made of a material having a high emissivity.

3. The rotary anode X-ray tube according to claim 1, wherein a cooling medium path is formed along the outer periphery of said evacuated casing.

4. The rotary anode X-ray tube according to claim 1, wherein a cooling medium path is formed in said yoke and also in said permanent magnet.

5. The rotary anode X-ray tube according to claim 1, wherein a detector for detecting the displacement or the rate of displacement of said rotor in the axial directions thereof and directions normal to said axial directions is provided on the outer periphery of said outer tube, and also wherein units for supplying the flux by current in said control winding, according to the output of said detector, is provided.

6. The rotary anode X-ray tube according to claim 1, wherein said conductive shaft member includes a portion coaxially extending in said hollow cylindrical rotor and said inner tube of said evacuated casing has a closed end having a central hollow cylindrical projection surrounding said coaxially extending portion.

7. The rotary anode X-ray tube according to claim 6, wherein emergency ball bearings are provided on the inner periphery of said central hollow cylindrical projection along said coaxially extending portion.

8. The rotary anode X-ray tube according to claim 1, wherein a contact member is provided in a bottom portion of said central hollow cylindrical projection of said inner tube so as to face the corresponding end of said coaxially projecting portion, and an anode current lead conductor connected to said contact member.

9. The rotary anode X-ray tube according to claim 1, wherein a ferromagnetic ring member is provided on the pole surface of said permanent magnet on the side nearer the rotor.

10. The rotary anode X-ray tube according to claim 1, wherein one end of said ring member has an end face extending normal to the axis of said rotor.

11. The rotary anode X-ray tube according to claim 10, wherein said ring member consists of a plurality of thin ring elements laminated in the axial direction of said rotor.

12. The rotary anode X-ray tube according to claim 11, wherein said ring elements are made of silicon steel.

13. The rotary anode X-ray tube according to claim 11, wherein said ring member is made of a sintered material or of a press powder material.

14. The rotary anode X-ray tube according to claim 10, wherein said means for giving a rotational driving force to said rotor includes a stator provided on the outer periphery of said outer tube.

15. The rotary anode X-ray tube according to claim 14, wherein a conductive ring is provided on a portion of said rotor corresponding in position to said stator.

16. The rotary anode X-ray tube according to claim 14, wherein at least a portion of said rotor facing said stator is made of a conductive material.

17. The rotary anode X-ray tube according to claim 16, wherein said conductive material is titanium alloy.

18. The rotary anode X-ray tube according to claim 15, wherein said two ring members made of ferromagnetic material are provided on the inner periphery of said hollow cylindrical rotor and spaced apart at a predetermined distance in the axial direction of said rotor, and said conductive ring is provided on a portion of the outer periphery of said rotor corresponding to the inner periphery portion thereof, between said ring members.

19. The rotary anode X-ray tube according to claim 15, wherein said conductive ring is provided on the inner periphery of said rotor between said two ferromatnetic rings in the axial direction of said rotor.

20. The rotary anode X-ray tube according to claim 15, wherein said conductive ring is provided on a portion of the outer periphery of said rotor corresponding to the inner periphery portion of the center of the ring member in case of providing a single ring member on the inner surface of the rotor.

21. The rotary anode X-ray tube according to claim 1, wherein the anode current supplying means is so supported on a ball bearing as to allow the projection portion of the shaft rotate with substantially the same rotation speed as that of the top of the anode current supplying means, when the projection portion of the shaft contacts with said top.

* * * * *